March 19, 1968 E. LEGLER 3,374,119

CIRCUIT ARRANGEMENT FOR MIXING SIGNALS

Filed May 19, 1964 3 Sheets-Sheet 1

Jnventor:
Ernst Legler
by Michael J. Striker
Attorney

Inventor:
Ernst Legler
by Michael J. Striker
Attorney

CIRCUIT ARRANGEMENT FOR MIXING SIGNALS

Filed May 19, 1964 3 Sheets-Sheet 3

Inventor:
Ernst Legler
by Michael J. Striker
Attorney

United States Patent Office 3,374,119
Patented Mar. 19, 1968

3,374,119

CIRCUIT ARRANGEMENT FOR MIXING SIGNALS

Ernst Legler, Darmstadt, Germany, assignor to Fernseh G.m.b.H., Darmstadt, Germany Filed May 19, 1964, Ser. No. 368,554
Claims priority, application Germany, June 5, 1963, F 39,915
14 Claims. (Cl. 178—7.1)

ABSTRACT OF THE DISCLOSURE

A signal mixing arrangement for delivering an output signal with a constant level. The signals to be mixed are applied to input amplifiers having output signal currents substantially a linear function of direct currents flowing through these amplifiers. These direct currents are made adjustable. The outputs of the input amplifiers are connected to a common load which is current dependent. The impedance of the load is inversely proportional to the sum of the direct currents flowing through the input amplifiers. All of the input amplifiers may have a common load impedance in the form of the emitter-collector path of a transistor. At the amplifier end of this load an output signal with constant level is derived. The arrangement is also adapted for mixing signals of equal levels. The level of the output signal is independent of the number $n$ of the input signals. Each input signal contributes to the level of the output signal by the factor of $1/n$ of its own level.

The present invention relates to new and improved circuit arrangements for mixing signals, and more particularly to new and improved circuit arrangements for mixing video signals. More specifically, the present invention is concerned with an improved video signal mixer used in television studios.

In the transmission of pictures by means of television techniques, it is not always desirable to effect transition from one scene to another in a radical and sudden manner. Techniques have, accordingly, been developed for producing transitions gradually, as for example, fade-out, fade-in, dissolve and lap dissolve.

A fade-out is the gradual disappearance of a picture from the screen by reduction of its luminous intensity, the terminal result being a completely dark screen.

A fade-in is the gradual appearance of a picture on the screen by increasing its luminous intensity from zero to full or normal brilliance. A fade-in is, therefore, the reverse of a fade-out.

A dissolve is a fade-out followed immediately by a fade-in of a new and different picture on the screen.

When a fade-out and fade-in do not occur separately, or do not follow each other in time, but occur substantially at the same time so that the first picture gradually blends into and becomes the second picture, such a change is commonly called a lap dissolve.

In accordance with conventional television practice fade-outs and fade-ins are effected by means of a known video signal mixer. This known video signal mixer has a predetermined number of signal channels with gain control circuits. The different video signals are applied by way of $n$ signal inputs via said channels to an adding stage. The level of the output signal of this adding stage depends upon the number of video signals applied to said signal inputs and upon the settings of said gain control circuits. When $n$ video signals are applied and all settings are adjusted to effect maximal gain the level of the output signal is $n$ times larger then the level of one video signal only. The television studios, however, have to supply video signals of constant levels to television transmitting stations.

In order to achieve this, the output video signal of such a known video signal mixer is applied by way of an automatic gain control circuit to the transmitting station. This prior art method of mixing video signals requires considerable technical expenditure and is not always as accurate as might be desired.

It is a broad object of the present invention to provide a novel signal mixing arrangement delivering an output signal with a constant level.

It is a further object of the present invention to provide a novel circuit arrangement for mixing signals of equal levels, the level of the output signal being independent of the number $n$ of the input signals and each input signal contributing with the factor of $1/n$ of its level to the level of the output signal.

It is still a further object of the present invention to provide a novel circuit arrangement and a method for effecting lap dissolves.

It is another object of the present invention to provide a novel circuit arrangement and a method for effecting a transition from one scene to another in radical and sudden manner and more particularly a straight-cut from one scene to another.

It is still another object of the present invention to provide a novel circuit arrangement for effecting fade-outs and fade-ins.

The present invention also provides a novel circuit arrangement for transmitting and mixing composite video signals comprising picture signal components, synchronizing components and blanking components. It is an additioal object of the present invention to effect fade-outs, fade-ins, dissolves, lap dissolves reducing the picture signal components at times to zero but keeping the level of the synchronizing components constant at all times.

In accordance with the present invention the signals to be mixed are applied by way of input amplifiers, the output signal currents of said input amplifiers being practically a linear function of adjustable direct currents flowing through these input amplifiers. The outputs of said input amplifiers are connected to a common current dependent load, the impedance of this load being inversely proportional to the sum of the direct currents flowing through the input amplifiers.

All these input amplifiers may have a common load impedance, as for example the emitter-collector path of a transistor, this impedance being inversely proportional to the sum of all direct currents flowing through it, so that at the amplifier end of this load an output signal with constant level is derivable.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Figure 3:
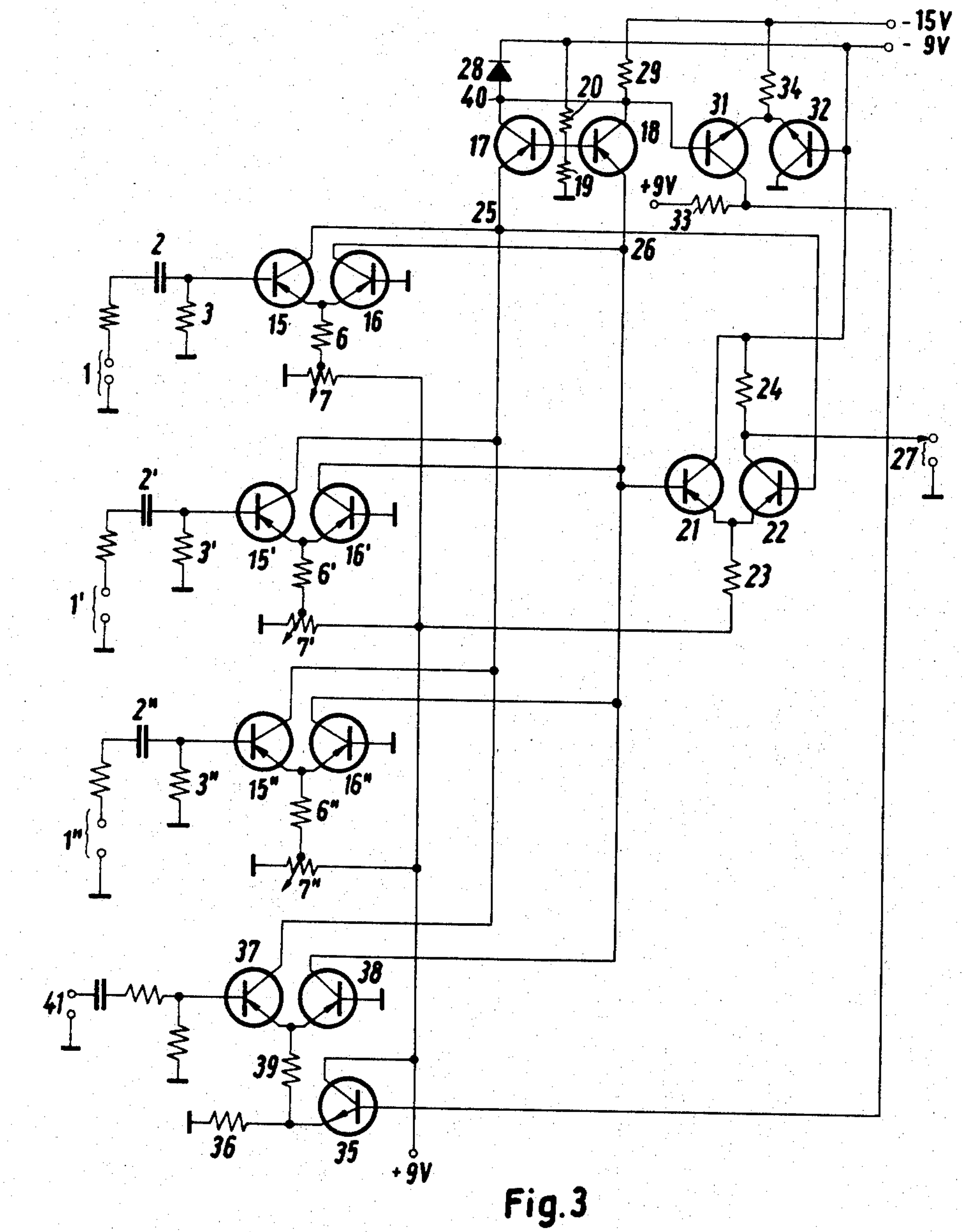
Figure 4:
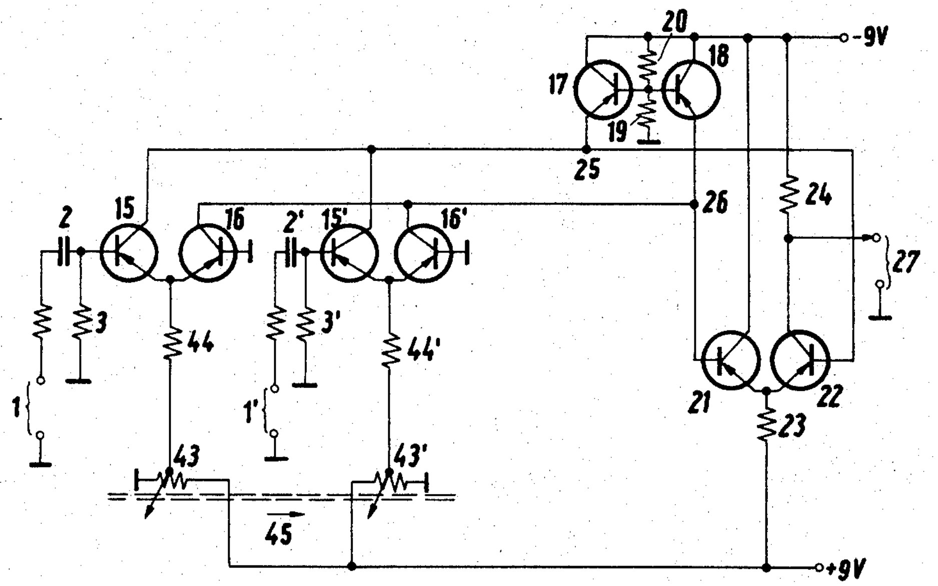
Figure 5:
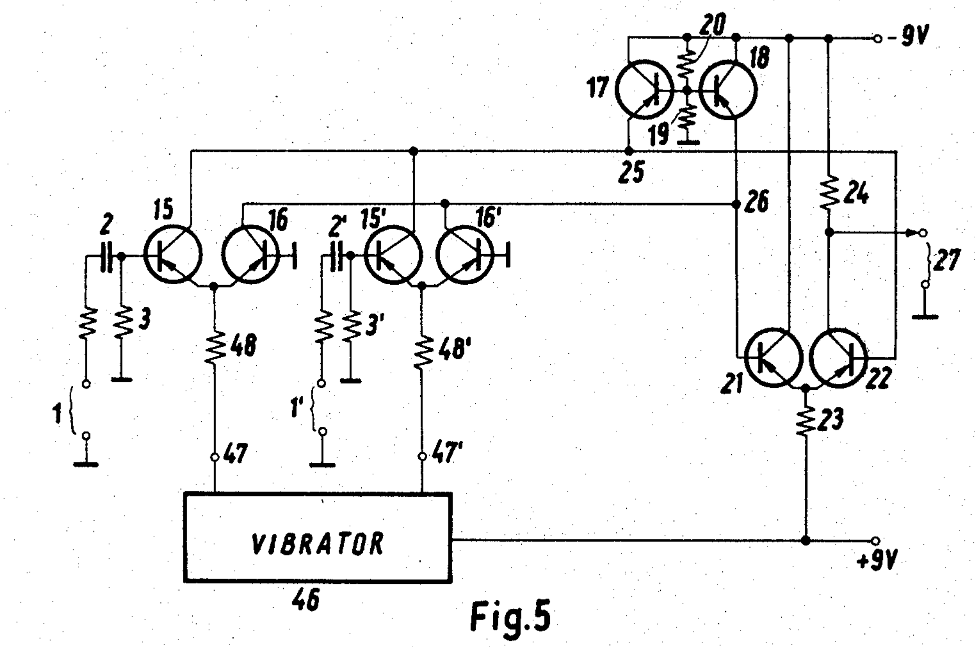

FIG. 3 is the diagram of a circuit arrangement for the mixing of one or more video signals, wherein the level of the output signal remains constant as long as the sum of the direct currents through a load is greater than a predetermined minimum value, while on the contrary the level of this output signal does not remain constant, when the sum of the direct currents is smaller than the predetermined minimum value;

FIG. 4 is the diagram of a circuit arrangement for effecting a lap dissolve;

FIG. 5 is the diagram of a circuit arrangement for effecting a transition from one scene to another in a sudden manner.

In all these drawings corresponding elements are designated by the same reference symbols.

Figure 1:
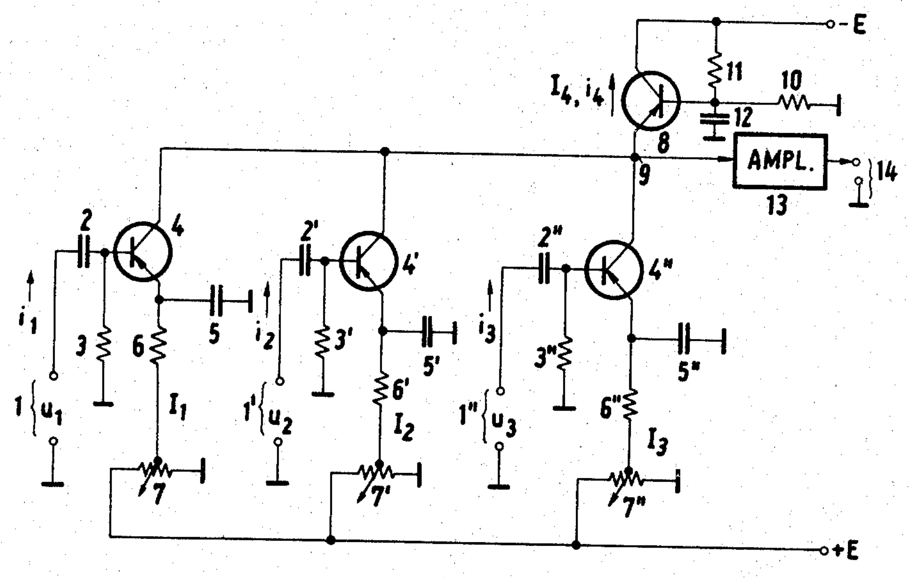
FIG. 1 is a principal circuit diagram of the circuit arrangement according to the invention.

By way of the terminals 1, 1' and 1'' respectively, the condensers 2, 2' and 2'' respectively of the circuit arrangement described in relation to FIG. 1 signal voltage $u_1$, $u_2$ and $u_3$ respectively are applied. The resistors 3, 3' and 3'' are connected between the bases of the transistors 4, 4' and 4'' respectively and ground. The emitters of these transistors are short-circuited to ground for the signal currents $i_1$, $i_2$ and $i_3$ respectively by way of the condensers 5, 5' and 5'' respectively. The potentiometers 7, 7' and 7'' respectively are used to control the gain. One end of these potentiometers respectively is connected to ground, the other ends respectively are connected to the positive pole of a voltage source (+E). The tappings are connected to the resistors 6, 6' and 6'' respectively. By means of these tappings control voltages are adjustable between zero and a maximum value.

The mutual conductance (the rate of change of the collector current with respect to the change of the base-emitter voltage) of the transistors 4, 4' and 4'' respectively is directly proportional to the corresponding collector direct current. Thus:

$$G_m = k.I_n \tag{1}$$

and approximate:

$$i_n = G_m.u_n = k.I_n.u_n \tag{2}$$

where $G_m$ is the mutual conductance of the *n*th transistor stage.
$I_n$ is the collector direct current through the *n*th transistor.
$i_n$ is the signal current.
$u_n$ is the signal voltage.
$k$ is a proportional factor.

The emitter-collector path of the transistor 8 operating in base connexion is connected to the negative pole of the operating voltage (−E), on the one hand, and to the collectors of the transistors 4, 4' and 4'' respectively, on the other hand, and forms thus the common load impedance of these transistors. The base potential of the transistor 8 is determined by the use of the resistors 10, 11. The condenser 12 provides a low impedance path to ground for signal frequencies.

The emitter input resistance $r_E$ is inversely proportional to the mutual conductance of this transistor 8 and thus also to the collector direct current $I_4$. This collector direct current is equal to the sum of the collector direct currents flowing through the transistors 4, 4' and 4'' respectively. In general:

$$r_E = \frac{1}{k\sum_1^n I_n} \tag{3}$$

The sum of the signal currents $i_4$ is equal to the sum of the signal currents flowing through the transistors 4, 4' and 4'' respectively. According to Equation 2 thus in general:

$$i_4 = k\sum_1^n I_n \cdot u_n \tag{4}$$

Assuming that the signal voltages $u_n$ have the same maximum values $u_o$ the maximum sum signal current $i_{4,\ max.}$ will flow when the maximum values of the signal voltage $u_n$ coincide. Thus according to Equation 4:

$$i_{4,\,max} = k\sum_1^n I_n \cdot u_o = k \cdot u_o \cdot \sum_1^n I_n \tag{5}$$

The maximum output voltage $u_{c,\ max.}$ (derivable in the circuit point 9) will be according to the Equations 3 and 5:

$$u_{c,\,max} = i_{4,\,max} \cdot r_E \frac{k \cdot u_o \cdot \sum_1^n I_n}{k \cdot \sum_1^n \cdot I_n} = u_o \tag{6}$$

Thus the maximum output voltage $u_{c,\ max.}$ is constant and independent of the setting of the potentiometers 7, 7' and 7'' respectively. The output voltage $u_c$ is applied by way of the circuit point 9 to the amplifier 13, and by way of terminal 14 a correspondingly amplified output signal is derivable.

Figure 2:
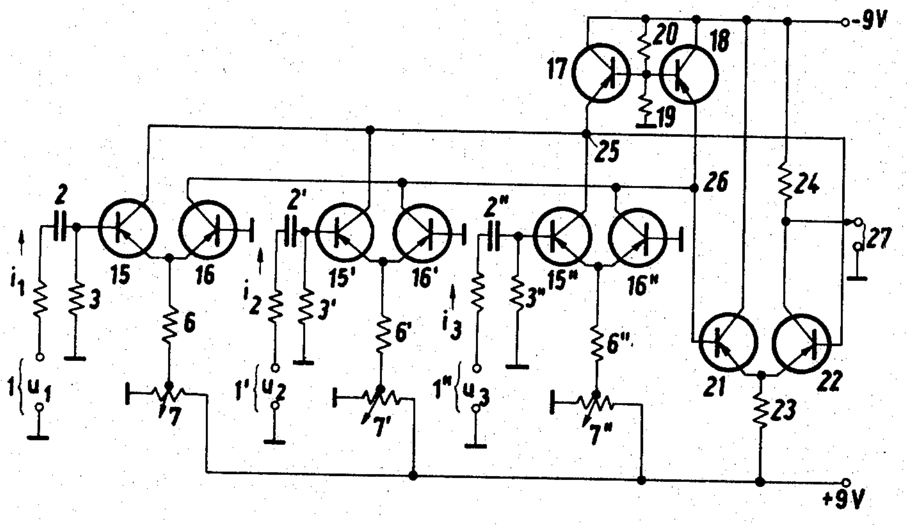
FIG. 2 is the diagram of a circuit arrangement for the mixing of one or more video signals, wherein the level of the output signal remains constant.

FIG. 2 shows a circuit arrangement comprising several emitter-coupled transistor pairs, consisting each of a first transistor 15, 15' and 15'' respectively and of a second transistor 16, 16' and 16'' respectively. Such kinds of transistor pairs connected as push-pull amplifier stages are advantages in particular when video signals are applied by way of the terminals 1, 1' and 1'' effecting transitions of scenes as for example, fade-outs, fade-ins and dissolves.

The emitters of the transistors pairs 15/16 and 15'/16' and 15''/16'' respectively are connected by way of the resistors 6, 6' and 6'' respectively to the tappings of the potentiometers 7, 7' and 7'' respectively. The collector direct currents $I_n$ are thus each fed in by way of one of the potentiometers 6, 6' and 6'' respectively and are uniformly distributed to both transistors 15/16, 15'/16' and 15''/16'' respectively.

The transistors 17 and 18 respectively operating in base connection form with their emitter input resistors the common load resistors of the transistors 15, 15', 15'' and 16, 16', 16'' respectively. The resistors 19 and 20 are parts of a voltage divider, one end of it being connected to ground, the other end being connected to the negative pole (−9 v.) of the operating voltage source, and the tapping being connected to the bases of the transistors 17 and 18.

A differential amplifier comprising the emitter-coupled transistors 21 and 22 and the resistors 23 and 24 converts the two push-pull sum signals (taken off at the circuit points 25 and 26 respectively) at high gain to a single-beat output signal, which is derivable by way of terminal 27.

The circuit arrangement as described in relation to FIG. 2 is in particular suitable for mixing video signals wherein the level of the output signal remains constant as for example for effecting a lap-dissolve. The circuit arrangement according to FIG. 2 is however not suitable for effecting a fade-out.

The circuit arrangement according to FIG. 3 shows the transistors 17 and 18 respectively, its emitter input resistors serving as load resistors of the transistors 15, 15', 15'' and 16, 16', 16'' respectively. As long as the sum of all direct currents flowing through these transistors 15, 15', 15'' and 16, 16', 16'' respectively is greater than a predetermined minimum value, these direct currents are all flowing through the diode 28 and the negative pole of the operating voltage (−9 v.). When the sum of these direct currents is reduced and falls below the predetermined minimum value (to which a defined desired voltage corresponds), the diode 28 will be blocked, and the current is supplied from the negative pole (−15 v.) of a further operating voltage source by way of the resistor 29. If this minimum value is slightly decreased, the desired voltage (the collector potential of the transistors 17 and 18) is increased. This increase of the desired voltage is amplified in a control stage, that is in the D.C. amplifier comprising the transistors 31, 32 and the resistors 33, 34 the signs being reversed, and a control signal is derived. This control signal is applied to the push-pull transistor stage comprising transistors 37 and 38 by way of the impedance converter comprising transistor 35 and the emitter resistor 36 and by way of resistor 39. The transistor 35 and the resistors 36 and 39 simulate a direct current source, controlled by the control signal such that the desired voltage remains constant in the circuit point 40. When at a lower minimum value the diode 28 is blocked, then additional currents flow through the emitter-collector paths of the transistors 37 and 38 and through the transistors 17 and 18. These additional currents oppose a further reduction of the minimum value, so that the sum of the currents (the direct currents through the transistors 15, 15′, 15″, 16, 16′, 16″ and the currents through the transistors 37 and 38) remains almost constant. Thus also the emitter input resistors of the transistors 17 and 18 respectively remain constant, and the level of the output signal derived by way of terminal 27 is independent of the setting of the potentiometers 7, 7′, 7″. The minimum value of the sum of all signal currents flowing through the transistors 15, 15′, 15″ and 16, 16′, 16″ respectively is advantageously chosen slightly below the maximum current of one of the transistor pairs 15/16 and 15′/16′ and 15″/16″ respectively.

When in the circuit arrangement according to FIG. 3 two composite video signals are mixed, consisting of picture signal components, blanking components and synchronizing components, then the synchronizing component of the output signal derived by way of terminal 27 remains constant as long as the minimum value of the current is not reduced. A further reduction of this minimum value would decrease the level of this output signal to zero. This, however, is desired for the picture signal component and for the blanking component, but not for the synchronizing component.

In order to avoid that the level of the synchronizing component is reduced to zero value, a synchronizing signal is applied by way of terminals 41. The amplitude of this synchronizing signal is equal to the amplitude of the synchronizing component. The more the amplification of the amplifier stages with the transistors 15/16, 15′/16′, 15″/16″ decreases the larger is the amplification of the transistor pair 37, 38. Thus the minimum value of the sum current (through the transistors 15, 15′ 15″, 37, 16, 16′, 16″, 38) and the synchronizing component remain constant, while the picture signal component may be reduced to zero level. In this way the circuit arrangement according to FIG. 3 may be used to effect a fade-out of a picture. By way of example, and not by way of limitation, it is noted that an operating embodiment of the present invention constructed as disclosed according to FIGURES 2 and 3 employed components having the following characteristics:

| | |
|---|---|
| Transistors: | |
| 15, 16, 15′, 16′, 15″, 17, 18, 21, 22, 37, 38 | Type AF 124. |
| 31, 32, 35 | Type OC 141. |
| Resistors: | |
| 3, 3′, 3″ | 50 ohm. |
| 6, 6′, 6″ | 3.3K ohm. |
| 7, 7′, 7″ | Max. 1K ohm. |
| 19 | 470 ohm. |
| 20, 24 | 1K ohm. |
| 23 | 1.5K ohm. |
| 29 | 2.7K ohm. |
| 33 | 3.9K ohm. |
| 34, 39 | 3.3K ohm. |
| 36 | 10K ohm. |
| Condensers: | |
| 2, 2′, 2″ | 170 μf. |

The circuit arrangement according to FIG. 4 may be used to effect a lap-dissolve. Two video signals are applied to the circuit arrangement by way of the terminals 1 and 1′ respectively. In this case one of these video signals at zero level is initially transmitted to the output terminals 27. In the course of transition the level of the first video signal is reduced to zero level and the level of the second video signal is brought to its maximum level, and this second video signal is derived at the terminals 27.

This transition is carried out by means of two opposingly coupled potentiometers 43 and 43′. Two ends of these potentiometers are connected to ground, and the other end is connected to the positive pole of the operating voltage source (+9 v.). The tappings are connected by way of the resistors 44 and 44′ to the emitters of the transistor pairs 15/16 and 15′/16′. At the setting of the control means 45 shown the direct current reaches by way of the resistor 44 and the transistor pair 15/16 a lower limiting value equal to zero, while the direct current flowing through the resistor 44′ and the transistor pair 15′/16′ corresponds to an upper limiting value. Thus at this setting the video signal applied by way of the terminals 1′ is derived.

If, however, the control means 45 are moved in the direction of the arrow until again two limiting values of the direct voltages derived by way of the resistors 44 and 44′ respectively are obtained, then the video signal applied by way of terminal 1 is derived by way of the terminals 27, and the other video signal (applied by way of the terminal 1′) is suppressed.

The potentiometers 43, 43′ and the control means 45 may be used instead of the potentiometers 7 and 7′ respectively according to FIGS. 2 and 3, if a lap-dissolve shall be effected (as far as the video signals applied via the terminals 1 and 1′ respectively are concerned).

The circuit arrangement as described in relation to FIG. 5 may be used for effecting a straight-cut from one scene to another. A first video signal at maximum level may be initially transmitted to the output terminal 27, which is instantly replaced by a second video signal at maximum level at the moment of the cut.

This straight-cut is carried out by means of the bistable vibrator 46, which is adjustable at will and is brought to one of two stable states, to each of which corresponds a predetermined and different potential at the output terminals 47 and 47′ respectively. These output terminals are connected by way of resistors 48 and 48′ to the emitters of the transistor pairs 15/16 and 15′/16′ respectively. If by way of example a potential of 0 volt is applied to the output terminal 47 and a potential of +9 v. to the output terminal 47′, then the video signal applied by way of terminal 1′ is derivable at the output terminals 27. When the bistable vibrator 46 is switched to its other stable state, so that now +9 volt is applied to the output terminal 47 and 0 volt to the output terminal 47′, then the video signal applied by way of the terminals 1 is derivable at the output terminals 27.

The vibrator 46 with the output terminals 47 and 47′ respectively and the resistors 48 and 48′ respectively may be used instead of the potentiometers 7 and 7′ respectively and instead of the resistors 5 and 6′ respectively according to FIGS. 2 and 3, if a straight-cut shall be effected as far as the video signals applied via the terminal 1 and 1′ respectively are concerned.

The circuit arrangement according to FIG. 3 may be used also to effect a straight-cut as well as a lap-dissolve, if one of the video signals is applied to the terminals 1″ and the other one of the video signals to the terminals 41 (instead of the synchronizing signal) and if the components 1, 2, 3, 6, 7, 15, 16 and 1′, 2′, 3′, 6′, 7′, 15′, 16′ are not used. These kind of transitions are depending upon the operation of the potentiometer 7″. The level of the video signal applied by way of terminal 1″ and derived by way of output terminal 27 depends directly upon the setting of the hand operated potentiometer 7″ and the level of the other video signal is automatically controlled in the sense of a straight-cut or a lap-dissolve respectively.

The described circuit arrangement may be used in television studios. The video signals applied to the terminals 1, 1′, 1″ may be derived for example by means of slide scanning equipment television cameras, film scanners, magnetic tape recorders. The video signals derived by the terminals 27 are applied to the studio output and to a television transmitter respectively.

While the invention has been illustrated and described as embodied in an arrangement for effecting transitions from one scene to another it is not intended to be limited to the details shown, since various modifications and structural changes may be made without departing in any way from the spirit of the present invention.

What is claimed as new and desired to be secured by Letters Patent is:

1. A circuit arrangement for mixing signals comprising a plurality of input amplifiers, one for each of said signals, said input amplifiers delivering via corresponding output leads corresponding output signal currents being practically a linear function of direct currents through said input amplifiers, a plurality of control means, one for each of said input amplifiers, adjustably controlling said direct currents through said input amplifiers; connection means applying said signals to said input amplifiers respectively; a current depending load resistance, the impedance of said load resistance being practically inversely proportional to the direct current flowing through it; connection means connecting all said output leads of said input amplifiers to one end of said load resistance and to the output lead of said circuit arrangement; connection means connecting the other end of said load resistance to one pole of an operating voltage source; and connection means connecting said input amplifiers to the other pole of said operating voltage source.

2. Circuit arrangement according to claim 1 comprising a plurality of direct current sources, one for each of said signals, said direct currents of said sources being adjustable by said control means; connection means applying said signals to control electrodes of said input amplifiers respectively; connection means connecting further control electrodes of said input amplifiers to said direct current sources respectively.

3. Circuit arrangement according to claim 1 comprising a control stage generating a control signal whenever said direct current through said load resistance decreases below a predetermined minimum value; an additional input amplifier delivering via an output lead an output signal current being practically a linear function of a direct current through said additional input amplifier; additional control means controlling said direct current through said additional input amplifier in dependence upon said control signal applied to it; connection means connecting said output lead of said additional input amplifier to said one end of said load resistance and to said output lead of said circuit arrangement.

4. Control means according to claim 1 comprising two potentiometers; connection means connecting one end of said potentiometers respectively to said other pole of said operating voltage source; connection means connecting the other end of said potentiometers respectively to a circuit point of constant potential; coupling means opposingly coupling the tappings of said potentiometers, said tappings delivering direct currents its sum being constant independently of the setting of said coupling means; and connection means connecting said tappings to two of said input amplifiers respectively.

5. Control means according to claim 1 comprising a bistable vibrator having two output terminals and being adjustable to either one of two stable states, one of said output terminals delivering during one of said stable states a higher voltage than the other one of said output terminals, said one of said output terminals delivering during the other one of said stable states a lower voltage than the other one of said output terminals; connection means connecting said output terminal via a resistor respectively to control electrodes of two of said input amplifiers respectively.

6. Circuit arrangement for mixing signals comprising a plurality of transistors, one for each of said signals, said transistors delivering via their collector electrodes output signal currents being practically a linear function of direct currents through said transistors; a plurality of control means, one for each of said transistors adjustably controlling said direct currents through said transistors; connection means applying said signals to the bases of said transistors respectively; connection means connecting the emitters of said transistors via said control means to one pole of an operating voltage source; a plurality of condensers, one for each of said transistors; connection means connecting the emitters of said transistors via said condensers respectively to a circuit point of constant potential; a further transistor; connection means connecting all collectors of said transistors via the emitter-collector path of said first further transistor to the other pole of said operating voltage source; connection means connecting the base of said further transistor to a circuit point of constant potential; and connection means connecting all said collectors of said transistors to the output of said circuit arrangement.

7. Circuit arrangement for mixing signals comprising a plurality of transistor pairs, one for each of said signals, said pairs consisting of a first transistor and a second transistor each delivering via its collector electrodes output signal currents being practically a linear function of direct currents through said first and second transistors; a plurality of control means, one for each of said transistor pairs, adjustably controlling said direct currents through said transistor pairs; connection means applying said signals to the bases of the first transistors repectively; connection means connecting the emitters of said first and second transistors via said control mean to one pole of an operating voltage source; connection means connecting the bases of said second transistors to a circuit point of constant potential; a further transistor pair consisting of a first further transistor and a second further transistor; connection means connecting all collectors of said first transistors via the emitter-collector path of said first further transistor to the other pole of said operating voltage source; connection means connecting all collectors of said second transistors via the emitter-collector path of said second further transistor to said other pole of said operating voltage source; connection means connecting the bases of said first and said second further transistors to a circuit point of constant potential; a differential amplifier consisting of a first and a second transistor; connection means connecting all collectors of said first transistors to the base of said first transistor of said differential amplifier; connection means connecting all collectors of said second transistors to the base of said second transistor of said differential amplifier; and connection means connecting a load resistance of said differential amplifier to the output of said circuit arrangement.

8. Control means according to claim 7 comprising two potentiometers; connection means connecting one end of said potentiometers respectively to said other pole of said operating voltage source; connection means connecting the other end of said potentiometers respectively to a circuit point of constant potential; coupling means opposingly coupling the tappings of said potentiometers, said tappings delivering direct currents its sum being constant independently of the setting of said coupling means; and connection means connecting said tappings of said potentiometers to two of said transistor pairs respectively.

9. Control means according to claim 7 comprising a bistable vibrator having two output terminals and being adjustable to either one of two stable states, one of said output terminals delivering during one of said stable states a higher voltage than the other one of said output terminals, said one of said output terminals delivering during the other one of said stable states a lower voltage than the other one of said output terminals; connection means connecting said output terminal via a resistor respectively to control electrodes of two of said transistor pairs respectively.

10. Circuit arrangement according to claim 7 comprising a control stage generating a control signal whenever said direct current through said further transistor pair decreases below a predetermined minimum value; an additional transistor pair consisting of a first transistor and a second transistor each delivering via its collector electrodes output signal currents being practically a linear function of direct currents through said first and second transistors of said additional transistor pair; additional control means controlling said direct current through said additional transistor pair in dependence upon said control signal applied to it; connection means connecting the emitters of said additional transistor pair to said additional control means; connection means connecting the collector of said first transistor of said additional transistor pair via said emitter-collector path of said first further transistor to said other pole of said operating voltage source; and connection means connecting the collector of said second transistor of said additional transistor pair via said emitter-collector path of said second further transistor to said other pole of said operating voltage source.

11. Circuit arrangement for mixing composite video signals being composed of picture signal components, synchronizing components and blanking components according to claim 10 comprising a generator generating a synchronizing signal having an amplitude equal to the amplitude of said synchronizing components of said composite video signal; connection means applying said synchronizing signal to the base and said first transistor of said additional transistor pair; and connection means connecting the base of said second transistor of said additional transistor pair to a circuit point of fixed potential.

12. A circuit arrangement for mixing signals comprising a plurality of input amplifiers one for each of said signals, said input amplifiers delivering output signal currents substantially a linear function of direct currents through said input amplifiers; a plurality of control means one for each of said input amplifiers and adjustably controlling said direct currents through said input amplifiers; a current depending load resistance having impedance substantially inversely proportional to the direct current flowing through said load resistance; and voltage supply means connected to said input amplifiers and to said load resistance, said load resistance being also connected to all outputs of said input amplifiers and to the output of said circuit arrangement.

13. A circuit arrangement for mixing signals comprising a plurality of transistors one for each of said signals and delivering output signal currents substantially a linear function of direct currents through said transistors; a plurality of control means one for each of said transistors and adjustably controlling said direct currents through said transistors; voltage source means connected to said transistors via said control means; a plurality of capacitors each one being connected between the emitter of one transistor and a circuit point of constant potential; and a further transistor with emitter-collector path connected between the collectors of all of said transistors and said voltage source means, the base of said further transistor being connected to a circuit point of constant potential, whereby the collectors of all of said transistors are joined to the output of said circuit arrangement.

14. A circuit arrangement for mixing signals comprising a plurality of transistors each one associated with one of said signals and delivering output signal currents substantially a linear function of direct currents through said transistors; a plurality of control means one associated with each of said transistors and adjustably controlling said direct currents through said transistors; voltage supply means connected to the emitters of said transistors through said control means, said signals being applied to the bases of said transistors respectively; a plurality of capacitors one associated with each of said transistors and connected between the emitters of said transistors and a circuit point of constant potential; and a further transistor connected between all collectors of said transistors and said voltage supply means; the base of said further transistor being connected to a circuit point of constant potential.

References Cited

UNITED STATES PATENTS 2,997,668 8/1961 Nolle ---------- 330—124 XR

ROBERT L. GRIFFIN, *Primary Examiner.*

JOHN W. CALDWELL, *Examiner.*

R. L. RICHARDSON, *Assistant Examiner.*